(12) United States Patent
Kitago (10) Patent No.: US 8,442,314 B2
(45) Date of Patent: May 14, 2013

(54) IMAGE PROCESSING APPARATUS AND IMAGE PROCESSING METHOD

(75) Inventor: Masaki Kitago, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 665 days.

(21) Appl. No.: 12/702,773

(22) Filed: Feb. 9, 2010

(65) Prior Publication Data

US 2010/0246973 A1 Sep. 30, 2010

(30) Foreign Application Priority Data

Mar. 26, 2009 (JP) ................... 2009-077379

(51) Int. Cl.
*G06K 9/00* (2006.01)
(52) U.S. Cl.
USPC .......................................................... 382/167
(58) Field of Classification Search ........................ None
See application file for complete search history.

(56) References Cited

U.S. PATENT DOCUMENTS

| | | | |
|---|---|---|---|
| 5,915,046 A | 6/1999 | Echigo et al. | |
| 6,271,861 B1 | 8/2001 | Sargent et al. | |
| 6,313,840 B1 | 11/2001 | Bilodeau et al. | |
| 8,149,236 B2 * | 4/2012 | Nakao et al. | 345/423 |
| 2002/0172406 A1 * | 11/2002 | Rouet et al. | 382/128 |
| 2007/0009180 A1 * | 1/2007 | Huang et al. | 382/276 |
| 2008/0278479 A1 | 11/2008 | Sun et al. | |

FOREIGN PATENT DOCUMENTS

| | | |
|---|---|---|
| JP | 10-320585 | 12/1998 |
| JP | 11-345347 | 12/1999 |
| JP | 3764765 | 4/2006 |

OTHER PUBLICATIONS

"Object-Based Vectorization for Interactive Image Editing", In Proceedings of Pacific Graphics 2006, Brian Price, William Barrett, English Document 2006, vol. 22, Nos. 9-11, pp. 661-670.
"Image Vectorization Using Gradient Meshes", In Proceedings of SIGGRAPH 2007, 2007, vol. 26, No., Jian Sun, Lin Liang, Fang Wen and Heung-Yeung Shum, English Document, vol. 26, No. 3.

* cited by examiner

*Primary Examiner* — Vikkram Bali
(74) *Attorney, Agent, or Firm* — Cowan, Liebowitz & Latman, P.C.

(57) ABSTRACT

An object input unit extracts the area of an object as an object area, and a mesh generation unit divides the object area into a plurality of meshes to obtain position information, gradient information, and color information of respective vertices that form the meshes. An optimization unit determines the position information, gradient information, and color information of the vertices by dividing each of the meshes into a plurality of small areas, and performing processing for changing the position information, gradient information, and color information of the vertices so as to locally minimize the differences between color information within the small areas and that within portions of the object area corresponding to the small areas. To divide each of the meshes into a plurality of small areas, the optimization unit changes the number or size of small areas in accordance with the number of times of changing processing.

12 Claims, 9 Drawing Sheets

$$E(M) = \sum_{p=1}^{P} \sum_{u,v} \|I_p(m(u,v)) - f_p(u,v)\|^2$$

EVALUATION UNIT

EVALUATION UNIT

IMAGE PROCESSING APPARATUS AND IMAGE PROCESSING METHOD

BACKGROUND OF THE INVENTION

1. Field of the Invention

The present invention relates to a resolution-free image representation technique for converting an object in a raster image into gradient meshes by approximating the object by adjusting the positions, gradients, and colors of the meshes so as to reduce color errors between the meshes and the object.

2. Description of the Related Art

A method of approximating the contour of an object by a function such as a Bezier function or a spline function has been conventionally used for resolution-free representation of illustrations and texts. This method is a commonly used high-speed representation method but is poor in complex gradation representation.

A gradient mesh tool in Adobe Illustrator® is generally used to draw an object containing a complex gradation by resolution-free representation. The gradient mesh method can be used to draw a complex object by generating a cubic function by adding colors and gradients to meshes (patent references 1 and 2).

For resolution-free representation of an object containing a complex gradation, some proposed methods approximate an image by meshes. Examples of these methods are a method of approximating an image using triangular patches (patent reference 3), and a method of reducing approximation errors by dividing Bezier patches into small areas each (non-patent reference 1). Another proposed method realizes resolution-free representation using a relatively small number of meshes by constructing gradient meshes by solving an optimization problem (patent reference 4 and non-patent reference 2).

[Patent Reference 1] Japanese Patent Laid-Open No. 11-345347
[Patent Reference 2] Japanese Patent Laid-Open No. 10-320585
[Patent Reference 3] Japanese Patent Registration No. 03764765
[Patent Reference 4] U.S. Pre-Grant Publication No. 2008/0278479
[Non-patent Reference 1] Brian Price, William Barrett, "Object-based vectorization for interactive image editing", In proceedings of Pacific Graphics 2006, 2006, vol. 22, Nos. 9-11, pp. 661-670.
[Non-patent Reference 2] Jian Sun, Lin Liang, Fang Wen, Heung-Yeung Shum, "Image Vectorization using Optimized Gradient Meshes", In proceedings of SIGGRAPH 2007, 2007, vol. 26, No. 3.

The above-mentioned method of approximating an image using triangular patches poses a problem associated with object boundary representation. When the object boundary has a smooth curve, it is difficult to faithfully approximate this curve by linear meshes, so a large number of meshes must be used to faithfully approximate this curve. High-order meshes need to be used to approximate a complex boundary by a smaller number of meshes.

Since the above-mentioned method of reducing approximation errors by dividing Bezier patches into small areas each uses high-order meshes, it can faithfully approximate the object boundary. However, this method divides meshes into small areas each in order to reduce approximation errors, so it requires a relatively large number of meshes and, in turn, requires a relatively large amount of data to approximate a portion where a change in color of the object is complex.

The above-mentioned method of constructing gradient meshes by solving an optimization problem can realize resolution-free representation by a smaller number of meshes in both the object boundary and a portion where a change in color of the object is complex. However, this method solves an optimization problem by evaluating color errors between the meshes and the object for each pixel, so the performance of this method is likely to be adversely affected by high-frequency components such as scan noise.

SUMMARY OF THE INVENTION

The present invention has been made in consideration of the above-described problems, and provides a technique for efficiently approximating an object by gradient meshes.

According to the first aspect of the present invention, there is provided an image processing apparatus comprising: a unit which extracts an area of an object from an image as an object area; a division unit which divides the object area into a plurality of meshes and obtains position information, gradient information, and color information of respective vertices which form the meshes; and a calculation unit which determines the position information, gradient information, and color information of the vertices by dividing each of the meshes into a plurality of small areas, and performing processing for changing the position information, gradient information, and color information of the vertices so as to locally minimize differences between color information within the small areas and color information within the object area corresponding to the small areas, wherein to divide each of the meshes into a plurality of small areas, the calculation unit changes the number of small areas or a size of each small area in accordance with the number of times of the changing processing that is the number of times of change in position information, gradient information, and color information of the vertices.

According to the second aspect of the present invention, an image processing method to be executed by an image processing apparatus, comprising: a step of extracting an area of an object from an image as an object area; a division step of dividing the object area into a plurality of meshes and obtaining position information, gradient information, and color information of respective vertices which form the meshes; and a calculation step of determining the position information, gradient information, and color information of the vertices by dividing each of the meshes into a plurality of small areas, and performing processing for changing the position information, gradient information, and color information of the vertices so as to locally minimize differences between color information within the small areas and color information within the object area corresponding to the small areas, wherein in the calculation step, to divide each of the meshes into a plurality of small areas, the number of small areas or a size of each small area is changed in accordance with the number of times of the changing processing that is the number of times of change in position information, gradient information, and color information of the vertices.

Further features of the present invention will become apparent from the following description of exemplary embodiments with reference to the attached drawings.

DESCRIPTION OF THE EMBODIMENTS

Embodiments of the present invention will be described below with reference to the accompanying drawings. Note that the embodiments to be described hereinafter merely exemplify a case in which the present invention is actually practiced, and are practical embodiments of the arrangement defined in claims.

First Embodiment

Figure 1:
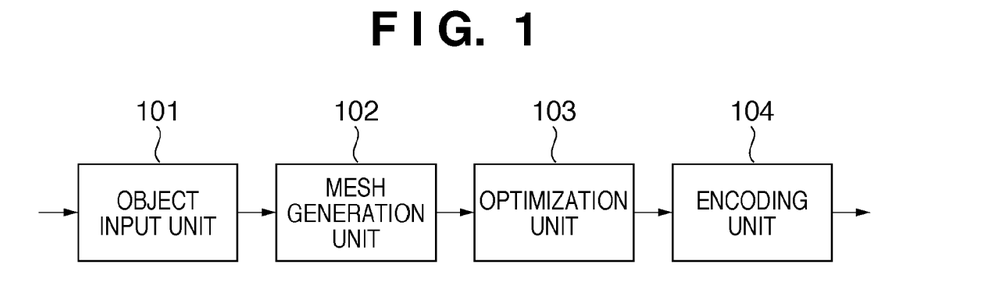
FIG. 1 is a block diagram illustrating an example of the functional arrangement of an image processing apparatus according to the first embodiment.

An example of the functional arrangement of an image processing apparatus according to this embodiment will be explained first with reference to FIG. 1. The image processing apparatus according to this embodiment includes an object input unit 101, mesh generation unit 102, optimization unit 103, and encoding unit 104, as shown in FIG. 1.

The object input unit 101 receives an input image containing one or more objects. This "object" means a text or an object image. This embodiment will be explained assuming that this "object" contains a color gradation. That is, meshes representing an object containing a color gradation are encoded in this embodiment.

Figure 3A:
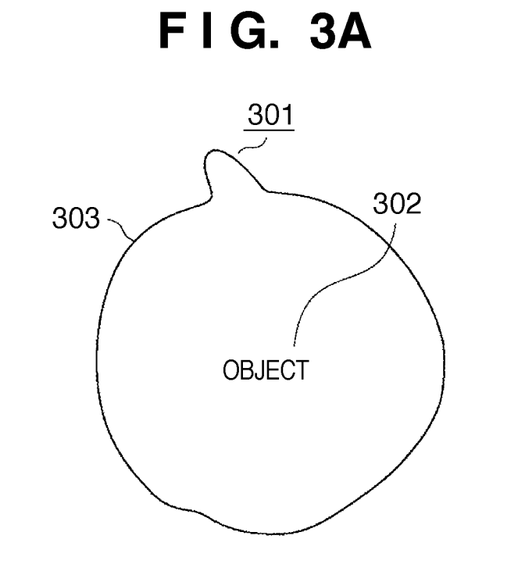
FIG. 3A is a view illustrating one example of the extracted object area.

The object input unit 101 extracts the area of an object from the input image as an object area. FIG. 3A illustrates one example of the extracted object area. Data on the extracted object area includes the coordinate positions, in the input image, of respective pixels which form a frame 303 of an object area 301, and the values of respective pixels which form an interior 302 of the object area 301. Although this embodiment will be explained assuming that the pixel value represents each of R, G, and B color components by 8 bits, the type of color component and the number of bits which form one color component are not limited to this. Also, data on an object area may have another structure as long as it is possible to obtain the coordinate positions of respective pixels that form the frame of the object area, and the values of respective pixels that form the interior of the object area. The object input unit 101 sends the data on the extracted object area to the mesh generation unit 102 in the subsequent stage.

Processing performed using the data on the object area by the mesh generation unit 102 will be explained with reference to FIG. 2. In step S201, using the coordinate positions of respective pixels that form the frame of the object area, the mesh generation unit 102 obtains a reference position within the object area. In this embodiment, the barycentric position (central position) of the object area is obtained as the reference position. As a matter of course, the reference position within the object area is not limited to the central position, and the processing for obtaining the central position is not limited to this, either.

In step S202, the mesh generation unit 102 sets two axes (the x- and y-axes), which intersect with each other at right angles at the central position obtained in step S201, within the object area to divide the object area into four regions. That is, four divided regions are obtained.

Figure 3B:
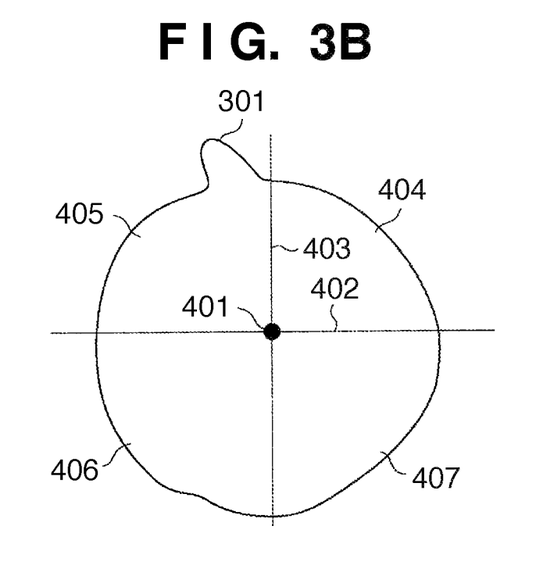
FIG. 3B is a view for explaining the processes in steps S201 and S202.

The processes in steps S201 and S202 will be explained with reference to FIG. 3B. Referring to FIG. 3B, reference numeral 401 denotes the central position obtained in step S201; and 402 and 403, two axes which intersect with each other at right angles at the central position 401 and run in the x- and y-axis directions, respectively, in the input image. The object area 301 is divided into divided regions 404, 405, 406, and 407 by setting the two axes 402 and 403.

Referring back to FIG. 2, in steps S203 and S204, the mesh generation unit 102 sets representative points on the frame portions of the respective divided regions such that the distance between the representative points in opposing divided regions is longest.

Figure 3C:
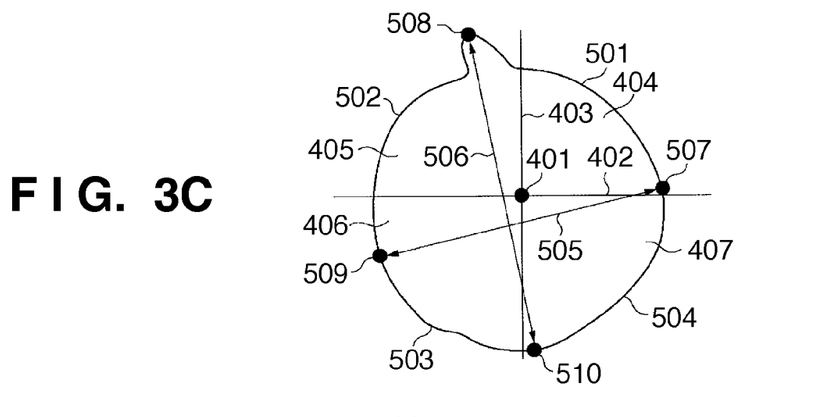
FIG. 3C is a view for explaining the processes in steps S203 and S204.

The processes in steps S203 and S204 will be explained with reference to FIG. 3C. Referring to FIG. 3C, reference numeral 501 denotes the frame portion of the divided region 404; 502, the frame portion of the divided region 405; 503, the frame portion of the divided region 406; and 504, the frame portion of the divided region 407.

Note that the mesh generation unit 102 determines the positions of a representative point on the frame portion 501 of the divided region 404 and that on the frame portion 503 of the divided region 406 opposing the divided region 404 such that the distance between these representative points is maximum. As a result, the mesh generation unit 102 sets a representative point 507 on the frame portion 501 and sets a representative point 509 on the frame portion 503, as shown in FIG. 3C.

Similarly, the mesh generation unit 102 determines the positions of a representative point on the frame portion 502 of the divided region 405 and that on the frame portion 504 of the divided region 407 opposing the divided region 405 such that the distance between these representative points is maximum. As a result, the mesh generation unit 102 sets a representative point 508 on the frame portion 502 and sets a representative point 510 on the frame portion 504, as shown in FIG. 3C.

That is, this processing can set one representative point on the frame portion of each divided region and, in turn, can arrange four representative points without any bias.

Referring back to FIG. 2, in step S205, the mesh generation unit 102 performs, processing for obtaining a cubic Bezier spline curve (parametric curve) which connects adjacent representative points to each other, for each set of adjacent representative points to obtain four cubic Bezier spline curves. This makes it possible to approximate the frame shape of the object area using these four cubic Bezier spline curves.

In step S206, the mesh generation unit 102 generates Coons patches from the four cubic Bezier spline curves obtained in step S205 to obtain one parametric surface from the four cubic Bezier spline curves.

Figure 3D:
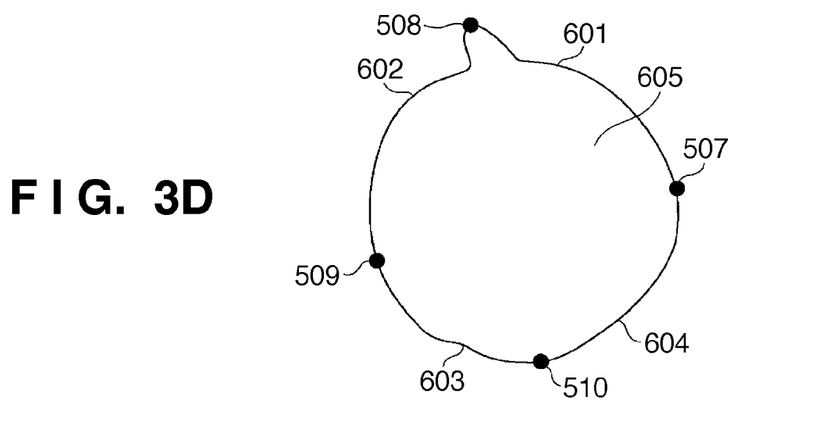
FIG. 3D is a view for explaining the processes in steps S205 and S206.

The processes in steps S205 and S206 will be explained with reference to FIG. 3D. Referring to FIG. 3D, reference numeral 601 denotes a cubic Bezier spline curve which connects the representative points 507 and 508; 602, a cubic Bezier spline curve which connects the representative points 508 and 509; 603, a cubic Bezier spline curve which connects the representative points 509 and 510; and 604, a cubic Bezier spline curve which connects the representative points 510 and 507.

Hence, in the case of FIG. 3D, the mesh generation unit 102 obtains the four cubic Bezier spline curves 601 to 604 in step S205. Then, the mesh generation unit 102 obtains a parametric surface 605 by representing the area surrounded by these four cubic Bezier spline curves 601 to 604 in the form of a parametric surface using Coons patches in step S206. Note that this processing is performed by a known technique, and a more detailed description thereof will not be given.

Referring back to FIG. 2, in step S207, the mesh generation unit 102 uniformly divides the parametric surface, obtained in step S206, in the u and v directions to generate a mesh group. That is, the mesh generation unit 102 two-dimensionally samples points on the parametric surface in the u and v directions to divide the parametric surface (object area) into meshes each defined by four sampled points. Position information indicating the positions of respective vertices which form the meshes, gradient information of the vertices at these positions, and color information of the vertices at these positions are obtained by this division processing.

To efficiently perform the subsequent optimization processing, it is desirable to generate meshes at positions close to optimal meshes. It is also desirable to adaptively arrange meshes in a number corresponding to the image features.

Figure 4:
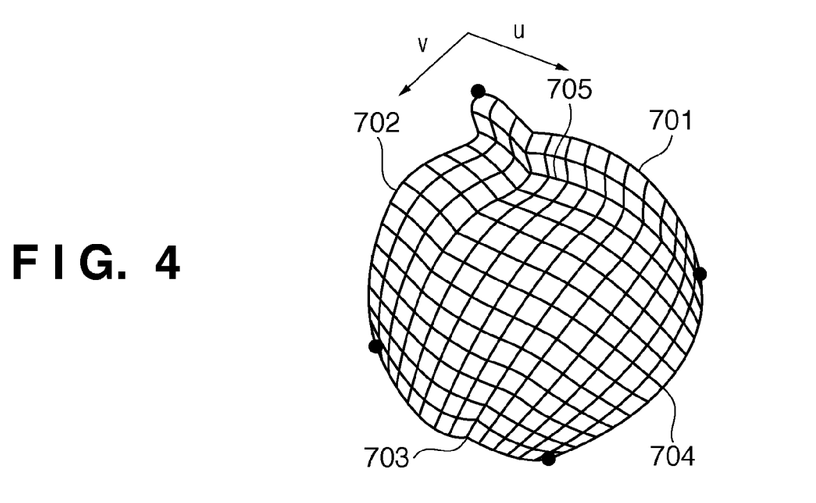
FIG. 4 is a view for explaining the process in step S207.

The process in step S207 will be explained with reference to FIG. 4. Referring to FIG. 4, cubic Bezier spline curves 701 and 703 extend in the u direction (i.e., the direction defined by the parametric surface), and cubic Bezier spline curves 702 and 704 extend in the v direction (i.e., the direction defined by the parametric surface). In this case, points on the parametric surface are two-dimensionally sampled in the u and v directions to divide the parametric surface into meshes each defined by four sampled points, thereby generating a mesh group 705. That is, the parametric surface is divided into a plurality of meshes.

Because the parametric surface is described by parameters which take values of 0 to 1 in both the u and v directions, "uniform division" means herein sampling of points at respective positions when the parameters are changed in steps of 0.1 if the parametric surface is divided into, for example, 10 areas. As a matter of course, the numbers of division in the u and v directions may be arbitrarily set. Referring to FIG. 4, the numbers of division in the u and v directions are both 15.

After the mesh generation unit 102 performs the above-mentioned processing, the optimization unit 103 starts the following processing. That is, a group of pieces of information:

Mesh Position Information (Two-dimensional Coordinates)
  Gradient Information
  Color Information (RGB values)
  Color Gradient Information
are optimized so that an error between the color within each mesh calculated from a plurality of meshes on the thus generated parametric surface and that at a position, in the input image, corresponding to the position of each mesh becomes a local minimum.

Processing by the optimization unit 103 will be explained with reference to FIG. 5. First, in step S801, a variable i indicating the number of iterations is initialized to zero. In step S802, the size and number of small areas serving as division elements in step S803 are set. The size and number of small areas are determined based on the value of the variable i (the number of times of changing processing in steps S802 to S811) and the mesh shapes. Details of the setting of small areas will be described later, together with details of the following process in step S803.

In step S803, each mesh (initial mesh) generated by the mesh generation unit 102 is uniformly divided in the u and v directions to generate quadrangular patches, and the quadrangular patches are further divided into triangular patches. With this operation, the initial meshes are each divided into the small areas set in step S802. That is, in step S803, the initial meshes are each divided into a plurality of small areas (triangular patches in this case).

Figure 7A:
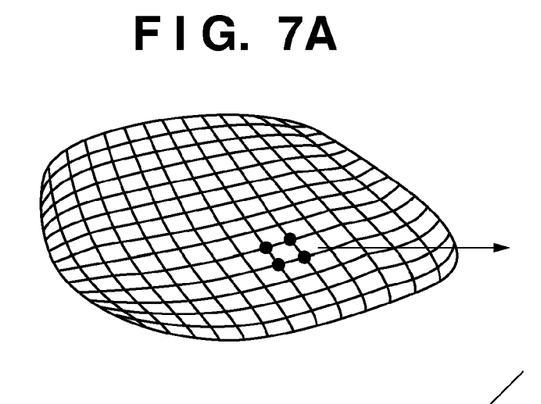
FIGS. 7A to 7D are views for explaining the processes in steps S802 and S803.

The processes in steps S802 and S803 will be explained with reference to FIGS. 7A to 7D and 11. A method of controlling the number of small areas divided in accordance with the value of the variable i will be explained first with reference to FIGS. 7A to 7D. FIG. 7A shows the initial meshes generated by the mesh generation unit 102.

Figure 7B:
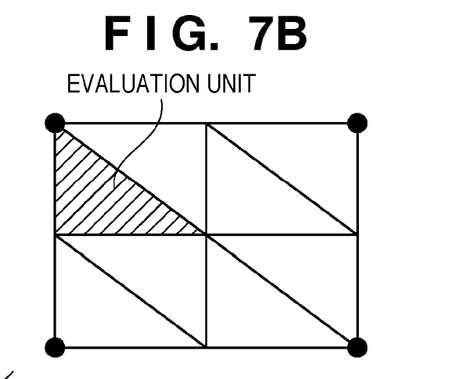

FIG. 7B shows a group of small areas obtained by setting the initial mesh shown in FIG. 7A (a mesh surrounded by the vertices indicated by four filled circles) in step S802 when a variable i=0 and dividing the initial mesh in step S803. One mesh is divided into 2×2 quadrangular patches, and the quadrangular patches are each further divided into two triangular patches, as shown in FIG. 7B.

Figure 7C:
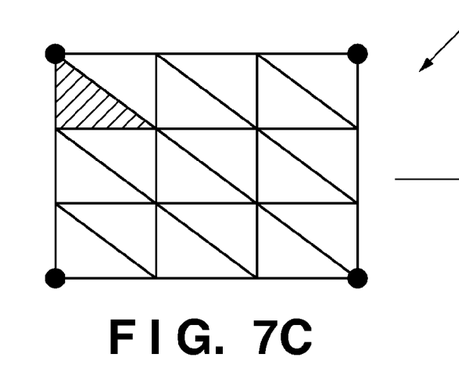

FIG. 7C shows a group of small areas obtained by setting the initial mesh shown in FIG. 7A in step S802 when a variable i=1 and dividing the initial mesh in step S803. One mesh is divided into 3×3 quadrangular patches, and the quadrangular patches are each further divided into two triangular patches, as shown in FIG. 7C.

Figure 7D:
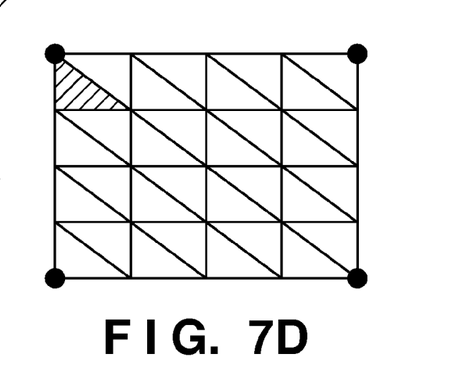

FIG. 7D shows a group of small areas obtained by setting the initial mesh shown in FIG. 7A in step S802 when a variable i=2 and dividing the initial mesh in step S803. One mesh is divided into 4×4 quadrangular patches, and the quadrangular patches are each further divided into two triangular patches, as shown in FIG. 7D.

In this manner, processing for dividing each mesh into small areas whose number increases as the number of times of changing processing increases is performed in steps S802 and S803 to control the number of division of meshes. Since one mesh is coarsely divided first, a smoothing effect can be obtained, thus suppressing the adverse effect of noise on the processing performance. This makes it possible to largely change meshes and, in turn, generate meshes as a coarse approximation of an object. After that, further dividing the meshes into a larger number of small areas makes it possible to generate meshes as a finer approximation of the object with little change of the divided meshes.

Figure 8A:
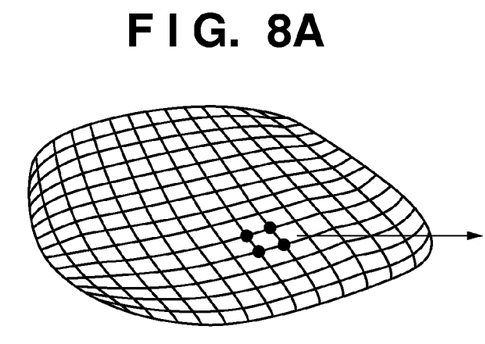
FIGS. 8A to 8D are views for explaining the processes in steps S802 and S803.
Figure 8B:
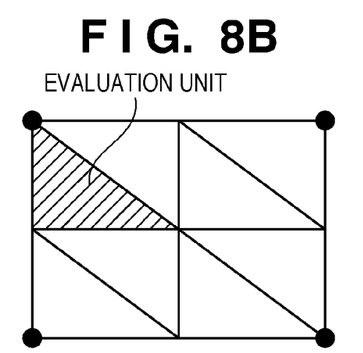
Figure 8C:
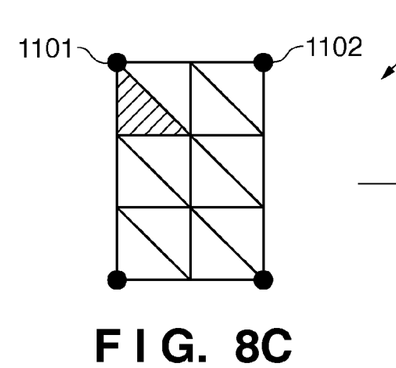
Figure 8D:
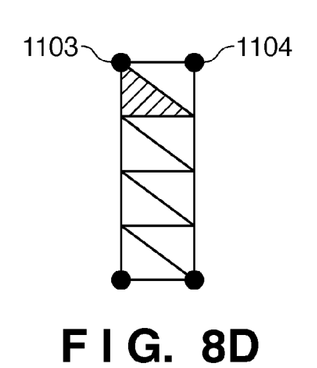

A method of controlling the size of small areas divided in accordance with the mesh shape will be explained next with reference to FIGS. 8A to 8D. FIG. 8A shows the initial meshes generated by the mesh generation unit 102. FIGS. 8B to 8D show the groups of small areas obtained by setting the initial mesh shown in FIG. 8A (a mesh surrounded by the vertices indicated by four filled circles) when a variable i=0, 1, and 2 in step S802, respectively, and dividing the initial meshes in step S803. As can be seen from FIGS. 8A to 8D, the mesh more thinly deforms as the value of the variable i increases. In this case, the numbers of division in the vertical and horizontal directions are changed, so that the size of triangular patches does not change to a threshold or less, based on the distance between the vertices of the mesh. In the case of, for example, FIG. 8C, the mesh is set so as to be divided into 3×3 patches as in FIG. 7C but is actually divided into 2×3 patches because the distance between vertices 1101 and 1102 of the mesh shortens. In the case of FIG. 8D, the mesh is set so as to be divided into 4×4 patches as in FIG. 7D but is actually divided into 1×4 patches because the distance between vertices 1103 and 1104 of the mesh further shortens.

In this manner, in order to control a size of each mesh, processing for dividing each mesh into small areas whose size reduces as the number of times of changing processing increases is performed in steps S802 and S803.

For this reason, either the number or sizes of meshes may be controlled in steps S802 and S803. This processing can stably obtain the evaluation values of color errors.

Referring back to FIG. 5, in step S804, the small areas (the triangular patches in this embodiment) are set as evaluation units of an energy function. In this case, the optimization accuracy is improved by optimization error calculation not for each pixel but for each small area. In the energy function given in FIG. 6, each mesh is divided in accordance with the number of small areas, the pixel values are calculated, the obtained pixels are connected to generate triangular patches, and the value of the energy function is evaluated for each triangular patch.

In step S805, a variable j indicating the number of iterations is initialized to zero. In step S806, a matrix is derived from the energy function. Note that each element (scalar value) of the matrix is a numeric value calculated using all mesh information. Optimal mesh information is unknown and must be mesh information with a local minimum energy value, which is obtained by changing the mesh information to various values. That is, a matrix whose size corresponds to unknowns ((Number of Mesh Vertices)×(Number of Parameters to be Changed)) needs to be derived and calculated. Although some matrix derivation methods are available, the known Levenberg-Marquardt method is used for the derivation herein.

Figure 6:
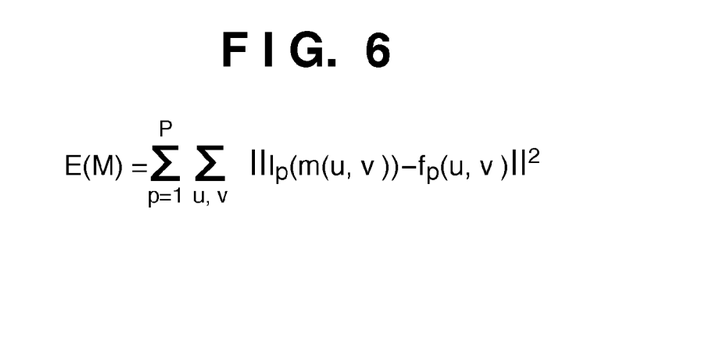
FIG. 6 is a view giving an energy function.

FIG. 6 gives an equation of an energy function, where M is a gradient mesh including P object areas, u and v are the parametric coordinates, p is the object area, Ip is the color of the original image within the object area p, m(u,v) is the coordinate position of the gradient mesh, and fp(u,v) is the color of the gradient mesh at the parametric coordinates (u,v) within the object area p. A matrix is derived by the Levenberg-Marquardt method, as described above, and unknowns at this time are position information (two-dimensional coordinates), gradient information, and color information of each mesh (its respective vertices).

That is, this calculation is processing for determining vertex position information, gradient information, and color information by processing for changing the vertex position information, gradient information, and color information so as to locally minimize the differences between color information within the small areas and that within portions of the object area corresponding to the small areas. The energy function is not limited to the equation given in FIG. 6 as long as the above-described object can be achieved.

In step S807, a solution Δu of simultaneous linear equations is calculated. In step S808, the variable j indicating the number of iterations is incremented by 1, thereby being updated. In step S809, it is determined whether the condition, in which the sum of absolute values (the amount of updating of each mesh) of Δu is equal to or smaller than the set threshold or the value of the variable j has reached the set maximum number of iterations, is satisfied. If it is determined in step S809 that this condition is satisfied, the process advances to step S810; otherwise, the process returns to step S806.

That is, position information (two-dimensional coordinates), gradient information, color information (RGB values), and color gradient information of each mesh (its respective vertices) are optimally updated by this changing processing (these pieces of information are changed so as to locally minimize the energy function).

In step S810, the value of the variable i is incremented by 1, thereby being updated. In step S811, it is determined whether the condition, in which the number of division into small areas in step S803 is equal to or larger than the set maximum value or the value of the variable i has reached the set maximum number of iterations, is satisfied. As a matter of course, the condition, in which the size of small areas divided in step S803 is equal to or smaller than the set minimum value or the value of the variable i has reached the set maximum number of iterations, may be used in step S811, depending on the control methods adopted in steps S802 and S803. If it is determined in step S811 that the above-mentioned condition is satisfied, this process is ended; otherwise, the process returns to step S802.

One example of parametric surfaces obtained by performing processing corresponding to the flowchart shown in FIG. 5 for the initial meshes shown in FIGS. 7A and 8A will be explained next with reference to FIG. 9A.

Each mesh is divided into 5×5 areas in the u and v directions when a variable i=0, into 10×10 areas in the u and v directions when a variable i=1, and into 20×20 areas in the u and v directions when a variable i=2. Average errors from the original image are brought close to minimum values of 1.26/pixel, 1.09/pixel, and 1.06/pixel, respectively. Note that the average errors are obtained by calculating errors of 256 RGB tones for each pixel. The image shown in FIG. 9A reveals that the mesh vertices largely move and therefore satisfactorily represent the image features.

Figure 9A:
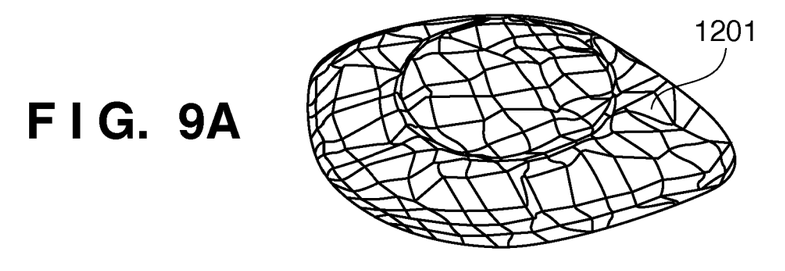
FIG. 9A is a view showing a parametric surface obtained by processing meshes in accordance with the flowchart shown in FIG. 5.

As shown in FIG. 9A, a parametric surface 1201 is generated by updating the two-dimensional coordinates, gradients, RGB values, and color gradients of each initial mesh (its respective vertices) so as to locally minimize the energy function.

Although the Levenberg-Marquardt method is used for the changing processing in this embodiment, another method such as the Gauss-Newton method may be used. Also, although the biconjugate gradient method with preconditioning is used to calculate simultaneous linear equations in the optimization processing, another method such as LU decomposition or Cholesky decomposition may be used. Moreover, color gradient information need not always be calculated as an unknown to facilitate the calculation.

Figure 9B:
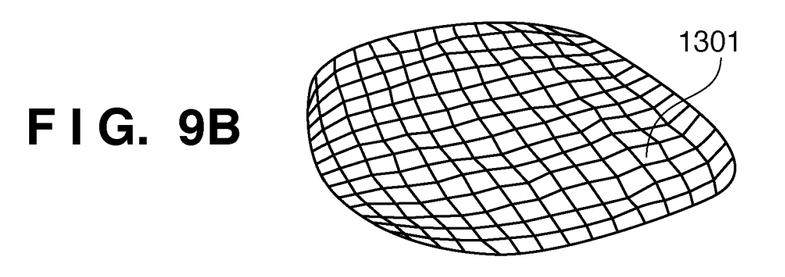
FIG. 9B is a view exemplifying a case in which the number of division of each mesh is set large from the beginning and optimization errors are calculated.

A case in which the numbers of division of the initial meshes shown in FIGS. 7A and 8A are set large from the beginning and optimization errors are calculated will be exemplified next with reference to FIG. 9B. The result of calculation of an average error from the original image assuming that the numbers of division are 20×20 in the u and v directions is 3.57/pixel, and this means the amount of decrease in error is small. Note that the average error is obtained by calculating an error of 256 RGB tones for each pixel. Also, the image shown in FIG. 9B reveals that the mesh vertices move less and therefore cannot represent the image features, as indicated by reference numeral 1301.

Referring back to FIG. 1, after the above-mentioned processing by the optimization unit 103, the encoding unit 104 encodes the mesh data (calculation result) obtained by the above-mentioned processing by the optimization unit 103 and manages the encoded data. As texts, the mesh data describes the contents of items:

A header containing, e.g., the number of vertices of each mesh in the u direction, the number of vertices of each mesh in the v direction, and the number of areas The x-coordinate, the y-coordinate, the gradient in the v direction, the scale value in the u direction, the scale value in the v direction, the RGB value, the color gradient in the u direction, and the color gradient in the v direction of each mesh vertex Although the encoding unit 104 encodes mesh data as text data describing the contents of these items by zip codes and manages the encoded data in this embodiment, another encoding method including irreversible encoding may be used.

As has been described above, according to this embodiment, color errors between meshes and an object are evaluated and locally minimized for each small area, and the number and size of small areas are changed in accordance with the number of iterations of optimization processing and the mesh shape. In this embodiment, this processing can improve the quality of an approximate image of an object obtained using gradient meshes and reduce the processing time.

Modification to First Embodiment

The respective units shown in FIG. 1 may be configured by hardware or implemented as software (computer programs). In this case, the software is installed on a memory of a general computer such as a PC (Personal Computer). The computer implements the functions of the above-mentioned image processing apparatus (the functions of the respective units shown in FIG. 1) by executing the installed software by the CPU of the computer. That is, the computer is applicable to the above-mentioned image processing apparatus. An example of the hardware configuration of a computer that can be adopted as the image processing apparatus according to the first embodiment will be explained with reference to FIG. 10.

A CPU 1401 controls the overall computer using computer programs and data stored in a RAM 1402 and ROM 1403, and performs the above-described respective processes of the image processing apparatus. That is, the CPU 1401 performs the above-described respective processes of the corresponding units shown in FIG. 1.

Figure 10:
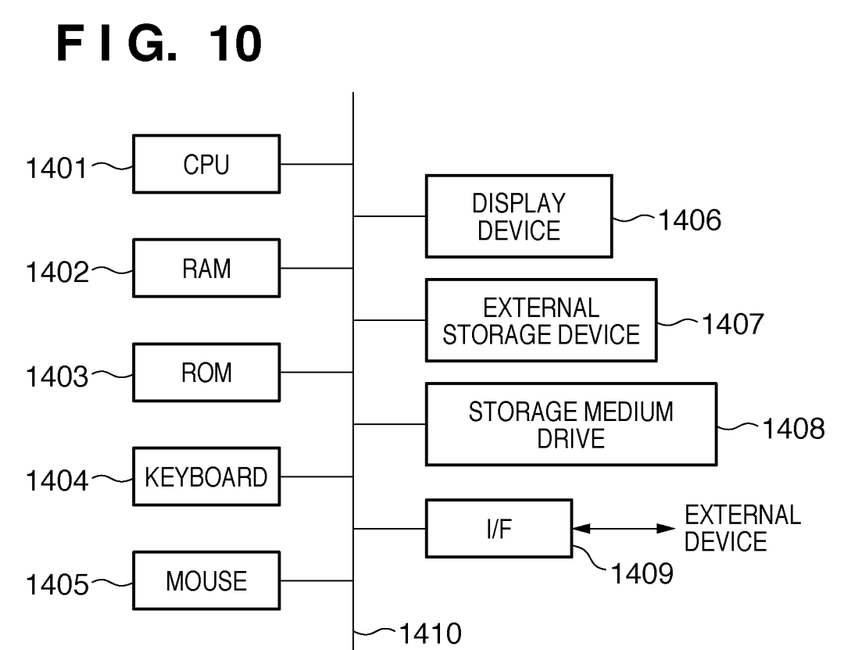
FIG. 10 is a block diagram illustrating an example of the hardware configuration of a computer.

The RAM 1402 is one example of computer-readable storage media. The RAM 1402 includes an area for temporarily storing, e.g., computer programs and data loaded from an external storage device 1407 and storage medium drive 1408 and data received from an external device via an I/F (interface) 1409. The RAM 1402 moreover includes a work area for use in various types of processes by the CPU 1401. That is, the RAM 1402 can provide various types of areas as needed. The ROM 1403 is one example of computer-readable storage media and stores computer setting data and a boot program.

A keyboard 1404 and mouse 1405 can be used to input various types of instructions to the CPU 1401 by being manipulated by the operator of the computer. A display device 1406 includes, e.g., a CRT or a liquid crystal screen, and can display the processing result obtained by the CPU 1401 in the form of, e.g., images and texts. The display device 1406 can, for example, display the above-described input image, clearly display the extracted object area, and display, e.g., the cubic Bezier spline curves and parametric surface obtained in the process of mesh encoding.

The external storage device 1407 is one example of computer-readable storage media and is a large-capacity information storage device typified by a hard disk drive device. The external storage device 1407 saves, e.g., computer programs and data for causing the CPU 1401 to implement the OS (Operating System) and the functions of the respective units shown in FIG. 1, data on the above-described input image, and the above-described known information. The computer programs and data saved in the external storage device 1407 are loaded into the RAM 1402 under the control of the CPU 1401 as needed and are processed by the CPU 1401.

The storage medium drive 1408 reads out computer programs and data recorded on a storage medium such as a CD-ROM or a DVD-ROM, and outputs the readout computer programs and data to the external storage device 1407 and RAM 1402. Some or all of the above-described information saved in the external storage device 1407 may be recorded on the storage medium and read out by the storage medium drive 1408.

The I/F 1409 is used to connect an external device to the computer. A device for acquiring the above-described input image, such as a digital camera, may be connected to the I/F 1409 so as to load the input image into the RAM 1402 and external storage device 1407 via the I/F 1409. Reference numeral 1410 denotes a bus which connects the above-mentioned respective units to each other.

In the above-mentioned configuration, when the power supply of the computer is turned on, the CPU 1401 loads the OS from the external storage device 1407 into the RAM 1402 in accordance with the above-mentioned boot program stored in the ROM 1403. This enables an information input operation via the keyboard 1404 and mouse 1405 and display of a GUI on the display device 1406. When the user manipulates the keyboard 1404 and mouse 1405 to input instructions for starting up an image processing application program stored in the external storage device 1407 to the CPU 1401, the CPU 1401 loads the program into the RAM 1402 and executes it. With this operation, the computer functions as the above-mentioned image processing apparatus.

Figure 2:
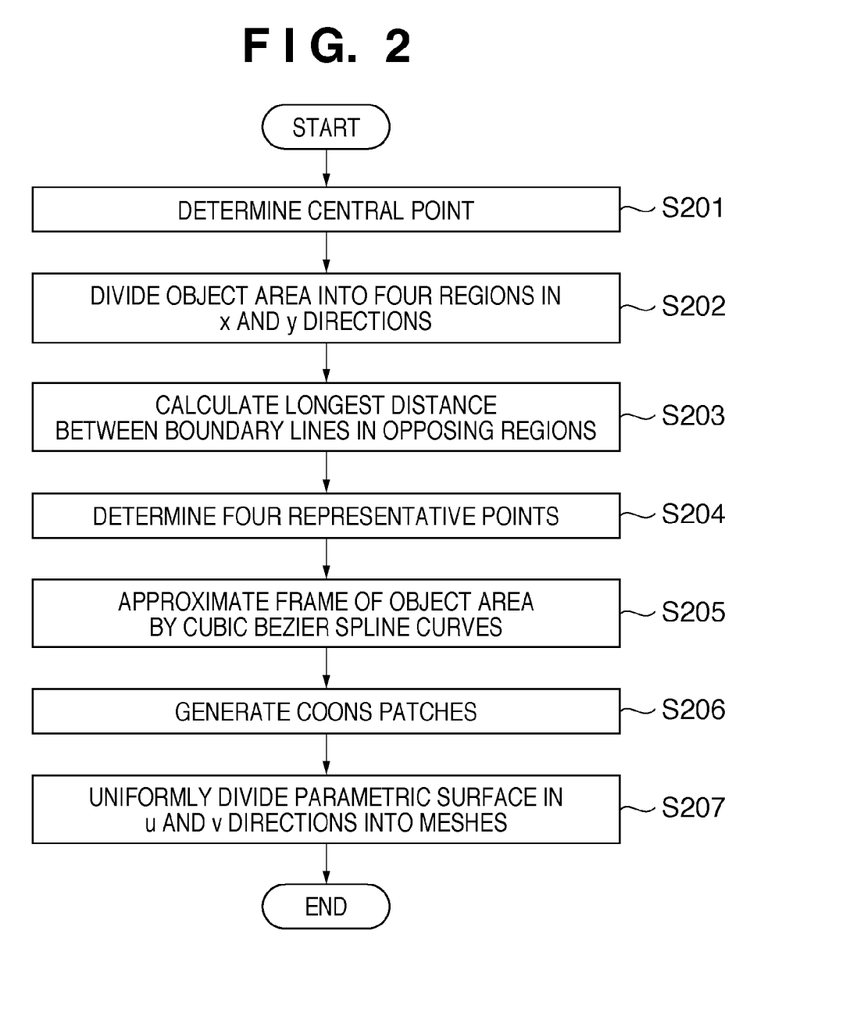
FIG. 2 is a flowchart of processing performed using data on an object area by a mesh generation unit 102.
Figure 5:
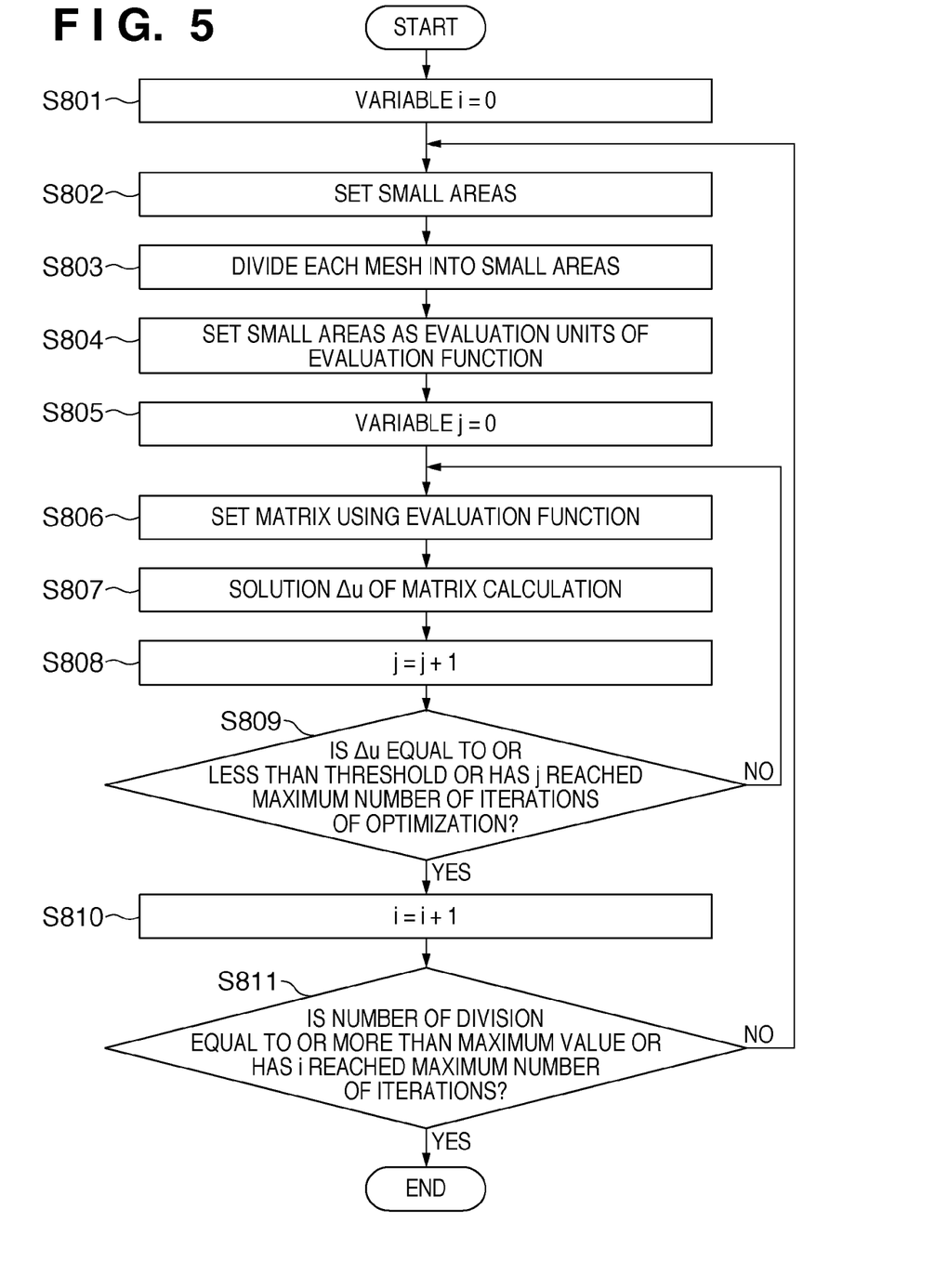
FIG. 5 is a flowchart of processing by an optimization unit 103.

The image processing application program executed by the CPU 1401 basically includes mathematical functions corresponding to the respective constituent elements shown in FIGS. 2 and 5. Note that the encoded gradient mesh data is saved in the external storage device 1407.

Second Embodiment

A method of determining the size or number of small areas based on a variable i indicating the number of iterations or the mesh shape to set small areas for use in mesh optimization has been explained in the first embodiment. However, in the first embodiment, an optimization problem often cannot be obtained with sufficiently high accuracy if the input object contains, e.g., a pattern with a feature in the direction of division. A method of setting small areas in consideration of this point in question will be explained in this embodiment.

The second embodiment is different only in the operation of an optimization unit 103 from the first embodiment, and a description thereof will be given. Processing by the optimization unit 103 will be explained with reference to FIG. 11. The same reference numerals as in FIG. 5 denote the same processing steps in FIG. 11, and a description thereof will not be given.

Figure 11:
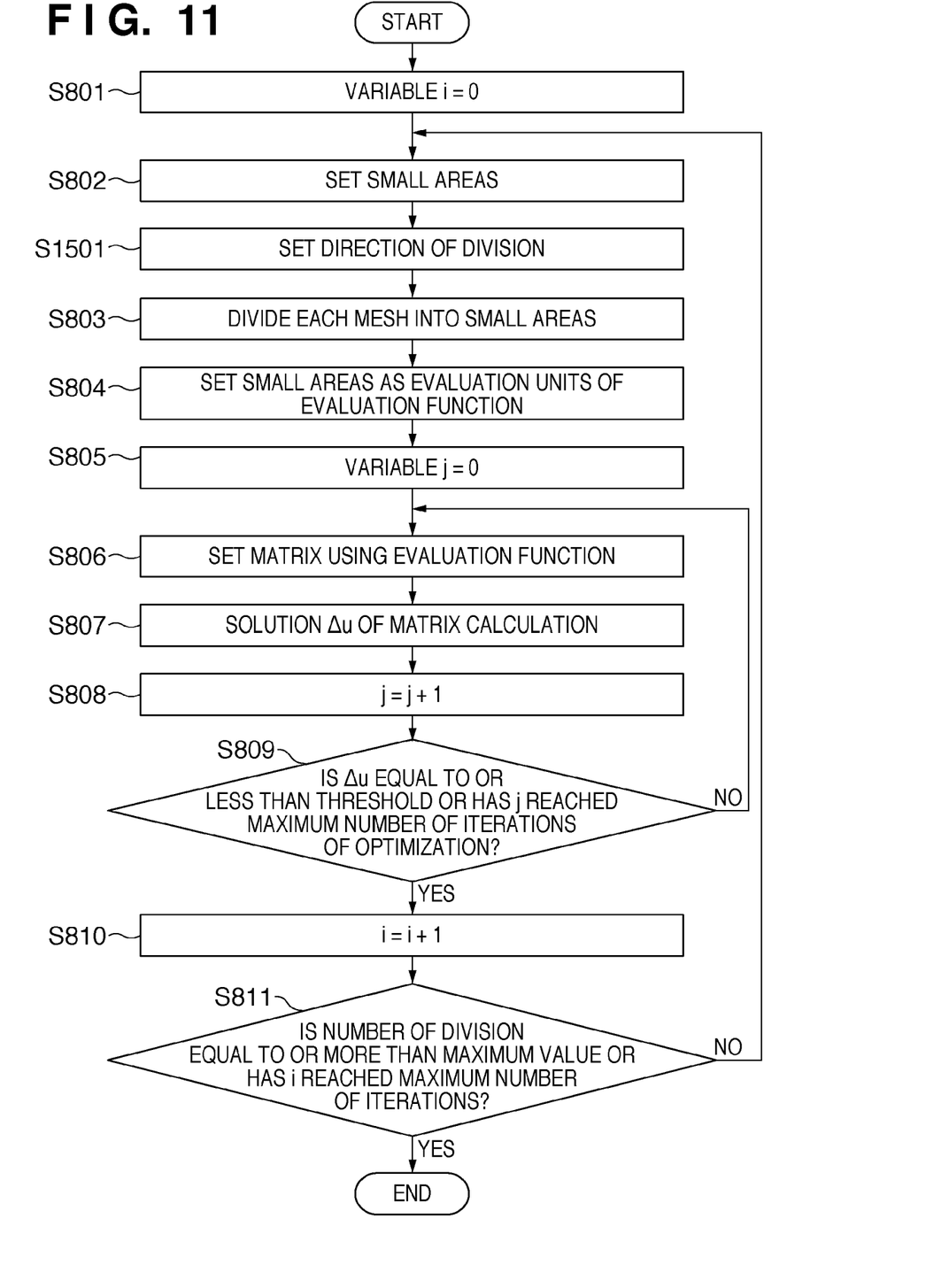
FIG. 11 is a flowchart of processing by an optimization unit 103.

In step S1501, the direction of division in step S803 is set based on a variable i indicating the number of iterations. Hence, in step S803, the initial meshes are each divided in the direction of division set in step S1501 into small areas set in step S802.

Figure 12A:
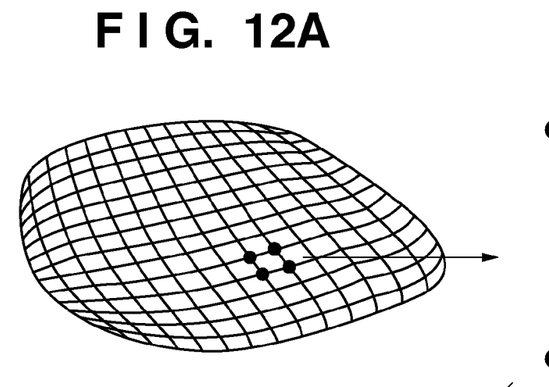
FIGS. 12A to 12D are views for explaining the processes in steps S802, S1501, and S803.

The processes in steps S802, S1501, and S803 will be explained with reference to FIGS. 12A to 12D. FIG. 12A shows the initial meshes generated by a mesh generation unit 102.

Figure 12B:
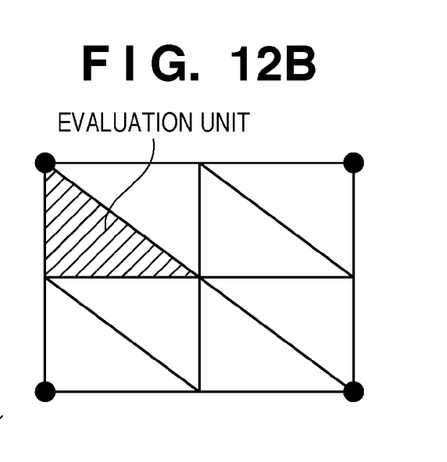

FIG. 12B shows a group of small areas obtained by setting the initial mesh shown in FIG. 12A (a mesh surrounded by the vertices indicated by four filled circles) in steps S802 and S1501 when a variable i=0 and dividing the initial mesh in step S803. That is, when a variable i=0, the initial mesh is divided into 2×2 quadrangular patches and the quadrangular patches are each further divided into two triangular patches. At this time, the division is done from the upper left to the lower right.

Figure 12C:
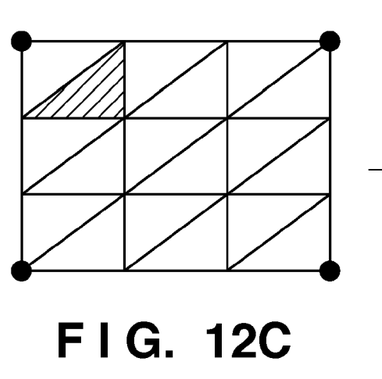

FIG. 12C shows a group of small areas obtained by setting the initial mesh shown in FIG. 12A in steps S802 and S1501 when a variable i=1 and dividing the initial mesh in step S803. That is, when a variable i=1, the initial mesh is divided into 3×3 quadrangular patches and the quadrangular patches are each further divided into two triangular patches. At this time, the division is done from the upper left to the lower right.

Figure 12D:
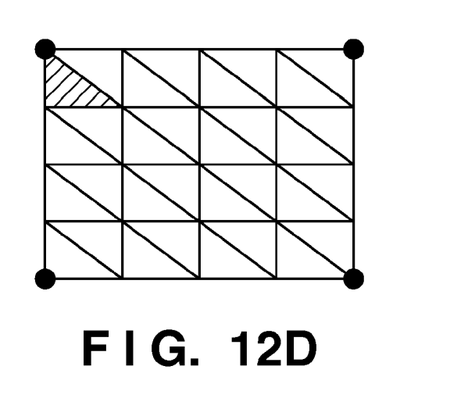

FIG. 12D shows a group of small areas obtained by setting the initial mesh shown in FIG. 12A in steps S802 and S1501 when a variable i=2 and dividing the initial mesh in step S803. That is, when a variable i=2, one initial mesh is divided into 4×4 quadrangular patches and the quadrangular patches are each further divided into two triangular patches. At this time, the division is done from the upper left to the lower right.

In this manner, the type of division is changed from coarse division to fine division and the direction of division is also changed, both with increasing number of iterations. This processing allows accurate evaluation of an energy function and, in turn, efficient solution of an optimization problem even when a distinctive image such as an image with an oblique pattern is input to the apparatus.

With the foregoing processing, the optimization unit 103 constructs optimal meshes. The operation of the encoding unit 104 using the optimal meshes generated by the optimization unit 103 is the same as in the first embodiment.

Modification

As described above, the second embodiment is different only in the operation of the optimization unit 103 from the first embodiment. Hence, a computer having the hardware configuration exemplified in FIG. 10 is applicable to the image processing apparatus according to the second embodiment, as a matter of course.

In a modification to the second embodiment, an image processing application program executed by a CPU 1401 basically includes mathematical functions corresponding to the respective constituent elements shown in FIGS. 2 and 11. Note that the encoded gradient mesh data is saved in an external storage device 1407.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-077379 filed Mar. 26, 2009, which is hereby incorporated by reference herein in its entirety.

What is claimed is:

1. An image processing apparatus comprising:
a unit which extracts an area of an object from an image as an object area;
a division unit which divides the object area into a plurality of meshes and obtains position information, gradient information, and color information of respective vertices which form the meshes;
a calculation unit which determines the position information, gradient information, and color information of the vertices by dividing each of the meshes into a plurality of small areas, and performing processing for changing the position information, gradient information, and color information of the vertices so as to locally minimize differences between color information within the small areas and color information within the object area corresponding to the small areas; and
an output unit which output the determined position information, gradient information, and color information of the vertices of each mesh as encoded data,
wherein to divide each of the meshes into a plurality of small areas, the calculation unit increases the number of small areas as the number of times of the changing processing increases that is the number of times of change in position information, gradient information, and color information of the vertices.

2. The apparatus according to claim 1, wherein the division unit comprises
a unit which obtains a reference position within the object area,
a unit which sets two axes, which pass through the reference position and are orthogonal to each other, within the object area to divide the object area into four divided regions by the two axes,
a unit which sets representative points on frame portions of the respective divided regions such that a distance between the representative points in opposing divided regions is longest,
a unit which performs, processing for obtaining a curve which connects adjacent representative points to each other, for each set of adjacent representative points to obtain four curves,
a unit which obtains a surface for an area surrounded by the four curves, using the four curves, and
a unit which two-dimensionally samples points on the surface in respective directions of two axes defined by the surface to divide the object area into meshes each defined by four points, thereby obtaining position information, gradient information, and color information of respective vertices which form the meshes.

3. The apparatus according to claim 2, wherein the curve includes a cubic Bezier spline curve.

4. The apparatus according to claim 2, wherein the surface includes a Coons patch.

5. The apparatus according to claim 1, wherein the calculation unit performs the changing processing using a Levenberg-Marquardt method.

6. The apparatus according to claim 1, further comprising a unit which encodes the calculation result obtained by the calculation unit and manages the encoding result.

7. The apparatus according to claim 1, wherein the small area includes a triangular patch.

8. A non-transitory computer-readable storage medium storing a computer program for causing a computer to function as each unit of an image processing apparatus defined in claim 1.

9. An image processing method to be executed by an image processing apparatus, comprising:
- a step of extracting an area of an object from an image as an object area;
- a division step of dividing the object area into a plurality of meshes and obtaining position information, gradient information, and color information of respective vertices which form the meshes;
- a calculation step of determining the position information, gradient information, and color information of the vertices by dividing each of the meshes into a plurality of small areas, and performing processing for changing the position information, gradient information, and color information of the vertices so as to locally minimize differences between color information within the small areas and color information within the object area corresponding to the small areas; and
- an output step of outputting the determined position information, gradient information, and color information of the vertices of each mesh as encoded data,
- wherein in the calculation step, to divide each of the meshes into a plurality of small areas, the number of small areas is increased as the number of times of the changing processing increases that is the number of times of change in position information, gradient information, and color information of the vertices.

10. An image processing apparatus comprising:
- a unit which extracts an area of an object from an image as an object area;
- a division unit which divides the object area into a plurality of meshes and obtains position information, gradient information, and color information of respective vertices which form the meshes;
- a calculation unit which determines the position information, gradient information, and color information of the vertices by dividing each of the meshes into a plurality of small areas, and performing processing for changing the position information, gradient information, and color information of the vertices so as to locally minimize differences between color information within the small areas and color information within the object area corresponding to the small areas; and
- an output unit which output the determined position information, gradient information, and color information of the vertices of each mesh as encoded data,
- wherein to divide each of the meshes into a plurality of small areas, the calculation unit reduces a size of each small area as the number of times of the changing processing increases that is the number of times of change in position information, gradient information, and color information of the vertices.

11. The apparatus according to claim 10, wherein to divide each of the meshes into a plurality of small areas, the calculation unit changes a direction of the division as the number of times of the changing processing increases.

12. An image processing method to be executed by an image processing apparatus, comprising:
- a step of extracting an area of an object from an image as an object area;
- a division step of dividing the object area into a plurality of meshes and obtaining position information, gradient information, and color information of respective vertices which form the meshes;
- a calculation step of determining the position information, gradient information, and color information of the vertices by dividing each of the meshes into a plurality of small areas, and performing processing for changing the position information, gradient information, and color information of the vertices so as to locally minimize differences between color information within the small areas and color information within the object area corresponding to the small areas; and
- an output step of outputting the determined position information, gradient information, and color information of the vertices of each mesh as encoded data,
- wherein in the calculation step, to divide each of the meshes into a plurality of small areas, a size of each small area is reduced as the number of times of the changing processing increases that is the number of times of change in position information, gradient information, and color information of the vertices.

* * * * *